(12) United States Patent
Miyawaki (10) Patent No.: US 12,049,348 B2
(45) Date of Patent: Jul. 30, 2024

(54) MULTILAYER FILM FOR CONTAINER AND CONTAINER COMPRISING SAME

(71) Applicant: HOSOKAWA YOKO CO., LTD., Tokyo (JP)

(72) Inventor: Ryosuke Miyawaki, Fujimi (JP)

(73) Assignee: HOSOKAWA YOKO CO., LTD., Tokyo (JP)

( * ) Notice: Subject to any disclaimer, the term of this patent is extended or adjusted under 35 U.S.C. 154(b) by 359 days.

(21) Appl. No.: 17/601,612

(22) PCT Filed: Apr. 7, 2020

(86) PCT No.: PCT/JP2020/015647
§ 371 (c)(1),
(2) Date: Oct. 5, 2021

(87) PCT Pub. No.: WO2020/209247
PCT Pub. Date: Oct. 15, 2020

(65) Prior Publication Data
US 2022/0194675 A1    Jun. 23, 2022

(30) Foreign Application Priority Data
Apr. 10, 2019 (JP) ................................ 2019-074850

(51) Int. Cl.
*B65D 75/26* (2006.01)
*B32B 7/12* (2006.01)
(Continued)

(52) U.S. Cl.
CPC ................ *B65D 75/26* (2013.01); *B32B 7/12* (2013.01); *B32B 27/08* (2013.01); *B32B 27/325* (2013.01);
(Continued)

(58) Field of Classification Search
CPC ........... B65D 75/26; B32B 7/12; B32B 27/08; B32B 27/325; B32B 27/327;
(Continued)

(56) References Cited

U.S. PATENT DOCUMENTS 3,914,521 A    10/1975  Beatty et al.
5,849,380 A *  12/1998  Kashiba ................... B32B 7/12
                                                428/36.6
(Continued)

FOREIGN PATENT DOCUMENTS

AU    38979/89    2/1990
BE    827341      9/1975
(Continued)

OTHER PUBLICATIONS

International Search Report for PCT/JP2020/015647, mailed Jun. 23, 2020, 5 pages.
(Continued)

*Primary Examiner* — Kareen K Thomas
(74) *Attorney, Agent, or Firm* — NIXON PEABODY LLP; Jeffrey L. Costellia (57) ABSTRACT

A multilayer film (10) for a container includes a surface layer (11) made of a polymethylpentene resin, an adhesive layer (12) made of a thermoplastic elastomer and adjacent to the surface layer, and a heat seal layer (13) laminated on the surface layer through the adhesive layer.

10 Claims, 1 Drawing Sheet

(51) Int. Cl.
*B32B 27/08* (2006.01)
*B32B 27/32* (2006.01)

(52) U.S. Cl.
CPC ........ *B32B 27/327* (2013.01); *B32B 2250/02* (2013.01); *B32B 2250/242* (2013.01); *B32B 2270/00* (2013.01); *B32B 2307/31* (2013.01); *B32B 2439/46* (2013.01)

(58) Field of Classification Search
CPC .......... B32B 2250/02; B32B 2250/242; B32B 2270/00; B32B 2307/31; B32B 2439/46; B32B 2250/03; B32B 2250/24; B32B 7/02; B32B 7/027; B32B 2250/246; B32B 2274/00; B32B 2307/30; B32B 2307/412; B32B 2307/72; B32B 2307/734; B32B 2307/738; B32B 27/302; B32B 27/32; B32B 2307/546; B32B 2439/80; C08L 2205/03; C08L 23/04; C09J 123/14; C09J 2301/208; C09J 2301/304; C09J 2423/00; C09J 2423/006; C09J 2423/04; C09J 2425/00; C09J 7/24; C09J 7/35; A61J 1/10

See application file for complete search history.

(56) References Cited

U.S. PATENT DOCUMENTS

| | | | | |
|---|---|---|---|---|
| 5,972,452 | A * | 10/1999 | Takahashi | B32B 27/08 428/72 |
| 6,218,017 | B1 * | 4/2001 | Yamashita | B32B 27/00 428/458 |
| 6,391,407 | B1 * | 5/2002 | Kashiba | B32B 27/08 428/35.9 |
| 2002/0023924 | A1 * | 2/2002 | Wisniewski | B32B 7/06 229/80.5 |
| 2004/0043239 | A1 | 3/2004 | Iwasaki et al. | |
| 2007/0212550 | A1 * | 9/2007 | ReFraschini | B32B 27/34 264/340 |
| 2008/0182097 | A1 * | 7/2008 | Mochizuki | C09J 7/30 428/355 EN |
| 2009/0202851 | A1 | 8/2009 | Maruichi et al. | |
| 2013/0129949 | A1 | 5/2013 | Iwasaki et al. | |
| 2014/0120281 | A1 | 5/2014 | Iwasaki et al. | |
| 2016/0120750 | A1 | 5/2016 | Iwasaki et al. | |
| 2020/0305526 | A1 * | 10/2020 | Gantz | C08J 11/06 |

FOREIGN PATENT DOCUMENTS

| | | |
|---|---|---|
| CA | 2 327 229 | 6/2001 |
| CA | 2 372 126 | 8/2002 |
| CA | 2 092 968 C | 3/2003 |
| CA | 2 947 210 | 5/2017 |
| CA | 2 994 287 | 8/2018 |
| CN | 105307854 | 2/2016 |
| JP | H-11-137241 | 5/1999 |
| JP | 2003-237002 | 8/2003 |
| JP | 2008-150541 | 7/2008 |
| JP | 2010-201648 | 9/2010 |
| JP | 2012-030497 | 2/2012 |
| JP | 2012-201392 | 10/2012 |
| JP | 2013-018211 | 1/2013 |
| JP | 2014-34424 | 2/2014 |
| JP | 2015-070092 | 4/2015 |
| WO | WO-2014/196594 | 12/2014 |

OTHER PUBLICATIONS

Yang et al., "Analysis and introduction of plastic materials for CO extrusion films", Plastic Packaging, vol. 28, No. 4, 2018, pp. 20-31 (13 pages).

Chinese Office Action for Application No. 202080027447.1, mailed Jul. 8, 2022 (16 pages).

Chinese Notice of Allowance for App. No. 202080027447.1, mailed Jun. 30, 2023 (10 pages).

Chuanhua Huang, "Study on the Heat Sealing Performance of Polyethylene Film", Plastic Packaging, No. 4, Aug. 15, 2008, pp. 70-73.

* cited by examiner

MULTILAYER FILM FOR CONTAINER AND CONTAINER COMPRISING SAME

TECHNICAL FIELD

The present invention relates to a multilayer film for a container and a container comprising the same.

Priority is claimed on Japanese Patent Application No. 2019-074850, filed Apr. 10, 2019, the content of which is incorporated herein by reference.

BACKGROUND ART

A multilayer film for a container is used in the retort-packed food or the medical field. As an infusion bag used for intravenous drip in the medical field, a blow container made by blow molding a synthetic resin such as polyolefin including polyethylene and polypropylene, polyvinyl chloride or the like, a soft bag made by heat sealing a synthetic resin film, and the like are exemplary examples. Among these, the soft bag is lightweight, has a small volume at the time of disposal, and does not require a ventilating needle that causes nosocomial infection at the time of administration, and thus the soft bag is widely used. In the related art, for such a soft bag, a polyolefin film made of polyethylene, polypropylene, or the like, in which eluent therefrom is little when steam sterilization is performed under a high pressure and has good transparency and flexibility, is used.

The soft bag used for the infusion bag is required to have hygiene, flexibility, transparency, and heat resistance and hot water resistance to enable high-pressure steam sterilization, and an amount of eluent from the soft bag is required to be small in order not to deteriorate the infusion solution (hereinafter, may be referred to as "low elution property").

However, in a case in which a polyolefin film is formed of multilayers of only a single type of polyolefin (hereinafter referred to as "multilayer polyolefin film") is used, there is a problem that the production efficiency per unit time is low in a process of manufacturing the soft bag. Specifically, as the polyolefin, a polyethylene-based resin, a polypropylene-based resin, and the like are exemplary examples. In order to improve production efficiency, a method manufacturing the soft bag by heat sealing the multilayer polyolefin film at a high temperature in a short time to manufacture a bag has the following problems. In the multilayer polyolefin film, the melting points of the resins that form all the layers are almost the same. Therefore, in a case in which the multilayer polyolefin film is heat sealed, the resins that form all the layers melt almost at the same time by the heat at the time of heat sealing. Therefore, in a case in which the multilayer polyolefin film is heat sealed, the thickness of the film may become too thin due to the high temperature and high pressure conditions at the time of heat sealing as well as the surface of the film is severely damaged. As a result, there is a problem in that the soft bag is likely to be torn or the soft bag is torn. In order to solve such problems, in a case in which the polyolefin film is formed of multilayers of only a single type of polyolefin is used, a process of forming the soft bag by heat sealing is carefully performed by taking the time and adjusting the temperature, the pressure, and the like.

In order to enable the high-speed and short-time heat sealing, a method using a multilayer film in which heat seal layers, which has a large difference in melting point, made of a heat-resistant resin and a resin that melts at a lower temperature than the heat-resistant resin are laminated is studied. As such a multilayer film, for example, a multilayer film is known in which a surface layer made of a polyamide resin composition, an adhesive layer, and a heat seal layer made of a polyethylene resin composition are laminated in this order (see, for example, Patent Document 1).

RELATED ART DOCUMENTS

Patent Documents

[Patent Document 1]
PCT International Publication No. WO2014/196594

SUMMARY OF INVENTION

Problem to be Solved by the Invention

However, in the multilayer film disclosed in Patent Document 1, since the polyamide resin that forms the surface layer has high hygroscopicity, in a case in which the film is heat sealed at a high temperature in order to improve the productivity when manufacturing the container from the film, the film may foam. In a case in which the film foams, there are problems that the appearance of the container is deteriorated and the strength of the container is lowered. Further, in a case in which the thickness of the polyamide resin layer in the multilayer film is increased and the usage amount of polyamide is increased, the hot water resistance of the multilayer film may become a problem. For example, in a case in which the container using the multilayer film is subjected to a retort processing, in some cases, the amount of eluent (monomer derived from the polyamide resin, or the like) in a case of holding the multilayer film in hot water is increased. In a case in which the multilayer film is held in hot water at 121° C. for a certain period of time and a pH test is performed to measure the pH of the hot water after holding, in some cases, the pH difference from the blank test solution is large, and the multilayer film cannot pass the Japanese pharmacopoeia standard. Therefore, in order to pass the standard, in some cases, it is sometimes necessary to blend hydrotalcite with the multilayer film. In addition, the blending of hydrotalcite, which is an inorganic substance, leads to an unfavorable increase in the residue on ignition required by the Japanese pharmacopoeia standard required for the medical container.

The present invention has been made in view of the above circumstances, and is to provide a multilayer film for a container and a container including the multilayer film for the container, which enable heat sealing at a high temperature and in a short amount of time, enable improving the production efficiency and have exceptional hot water resistance.

Means for Solving the Problem

A first aspect of the present invention relates to a multilayer film for a container, the multilayer film including a surface layer made of a polymethylpentene resin, an adhesive layer made of a thermoplastic elastomer and adjacent to the surface layer, and a heat seal layer laminated on the surface layer through the adhesive layer.

A second aspect of the present invention relates to the multilayer film for a container according to the first aspect, in which the thermoplastic elastomer is a polyolefin-based resin composition containing a styrene-based elastomer.

A third aspect of the present invention relates to the multilayer film for a container according to the first or second aspect, in which the heat seal layer is formed of two or more layers, and a layer that forms a heat seal surface of the heat seal layer is made of linear low-density polyethylene.

A fourth aspect of the present invention relates to the multilayer film for a container according to the first or second aspect, in which the heat seal layer is formed of two or more layers, and a layer that forms a heat seal surface of the heat seal layer is made of high-density polyethylene.

A fifth aspect of the present invention relates to the multilayer film for a container according to the first or second aspect, in which the heat seal layer is made of a mixed resin composition in which two or more types of resins are mixed.

A sixth aspect of the present invention relates to a container including the multilayer film for a container according to any one of the first to fifth aspects.

Effect of the Invention

According to the present invention, it is possible to provide a multilayer film for a container and a container including the multilayer film for the container, which enable heat sealing at a high temperature and in a short amount of time, enable improving the production efficiency and have exceptional hot water resistance.

EMBODIMENTS FOR CARRYING OUT THE INVENTION

An embodiment of a multilayer film for a container of the present invention and a container including the same will be described.

It should be noted that the present embodiment is specifically described in order to better understand the contents of the invention, and do not limit the present invention unless otherwise noted.

[Multilayer Film for Container]

Figure 1:
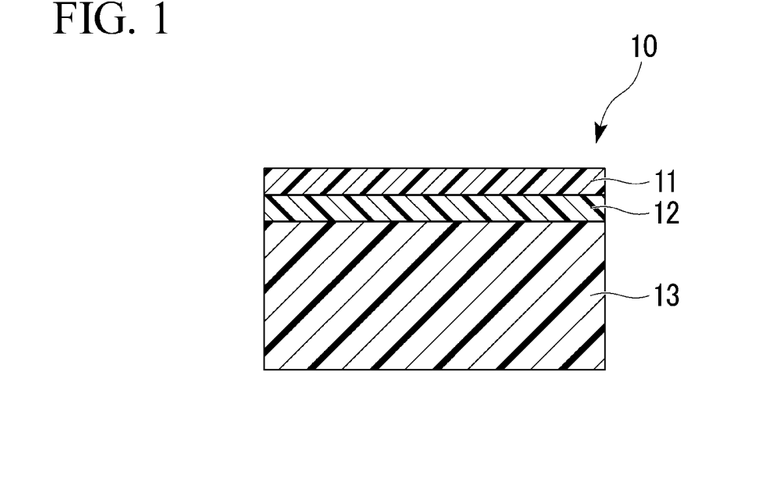
FIG. 1 is a vertical cross section showing an example of a film for an infusion bag of the present invention.

FIG. 1 is a vertical cross sectional view showing a schematic configuration of the embodiment of the multilayer film for the container of the present invention.

As shown in FIG. 1, a multilayer film 10 for a container of the present embodiment includes a surface layer 11, an adhesive layer 12, and a heat seal layer 13. Stated another way, the multilayer film 10 for the container is a film formed of three layers in which the surface layer 11 and the heat seal layer 13 are laminated through the adhesive layer 12.

"Surface Layer"

The surface layer 11 is a layer that is the outermost layer in a case in which the container is manufactured by using the multilayer film 10 for the container. Further, the surface layer 11 acts as a buffer layer that softens damage caused by external heating applied to the multilayer film 10 for the container when the container is manufactured and enables heat sealing at a high temperature and in a short amount of time.

The surface layer 11 is made of a polymethylpentene resin.

The polymethylpentene resin is a polymer formed of a monomer containing 4-methyl-1-pentene, a homopolymer of 4-methyl-1-pentene, or a copolymer of 4-methyl-1-pentene and another monomer.

As other monomers that copolymerize with 4-methyl-1-pentene, $\alpha$-olefin having 2 to 20 carbon atoms is an exemplary example. More specifically, ethylene, propylene, 1-butene, 1-pentene, 1-hexene, 1-octene, 1-decene, 1-dodecene, 1-tetradecene, 1-hexadecene, 1-octadecene, 1-eicosene, 3-methyl-1-butene, 3-methyl-1-pentene, 3-ethyl-1-pentene, 3-ethyl-1-hexene, and the like are exemplary examples. These monomers can be used alone or in combination of two or more thereof.

The polymethylpentene resin may be a mixture of the copolymer of 4-methyl-1-pentene and another monomer and the homopolymer of 4-methyl-1-pentene. The melting point of the polymethylpentene resin can be increased by mixing the copolymer of 4-methyl-1-pentene and another monomer with the homopolymer of 4-methyl-1-pentene.

The melting point of the polymethylpentene resin is preferably 180° C. or higher, more preferably 190° C. or higher, and still more preferably 200° C. or higher, from the viewpoint of exceptional heat resistance.

The reason why the melting point of the polymethylpentene resin is preferably in the range described above is as follows.

The difference between the melting point of the surface layer 11 and the melting point of the heat seal layer 13 which will be described below (hereinafter, referred to as "melting point difference") is preferably 40° C. or higher, and more preferably 50° C. or higher. In a case in which the melting point difference is lower than 40° C., the surface layer 11 tends to be easily damaged (the surface layer 11 tends to melt) due to the heat for melting the heat seal layer 13 at the time of heat sealing. Therefore, by setting the melting point of the polymethylpentene resin in the range described above, the melting point difference is set to 40° C. or higher, and the surface layer 11 is prevented from being damaged at the time of heat sealing.

The upper limit of the melting point difference is not particularly limited, but is generally about 120° C. In a case in which the melting point difference is too large, the film of the heat seal layer 13 is also formed at a high temperature at the time of co-extrusion, so that the viscosity of the heat seal layer 13 may be significantly lowered, and stable film formation may not be possible.

In the present embodiment, the melting point of the polymethylpentene resin is a value measured at a heating rate of 10° C./min using a differential scanning calorimeter (DSC) using pellets of the polymethylpentene resin.

In the present embodiment, the melt mass flow rate (hereinafter referred to as "MFR") of the polymethylpentene resin is a value measured according to JIS K 7210. Specifically, under the measurement conditions of a temperature of 260° C. and a load of 49.05 N, the MFR of the polymethylpentene resin is preferably 15 g/10 min to 150 g/10 min, and more preferably 20 g/10 min to 100 g/10 min. In a case in which the multilayer film 10 for the container is used as a medical film, the MFR of the polymethylpentene resin is preferably 20 g/10 min to 60 g/10 min from the viewpoint of processing suitability in the water quench blowing process for forming the multilayer film 10 for the container.

In a case in which the total thickness of the multilayer film 10 for the container is 100%, the thickness of the surface layer 11 is preferably 2% to 15%, more preferably 2% to 10%, and still more preferably 2% to 8%.

In a case in which the thickness of the surface layer 11 is equal to or more than the lower limit value of the range described above, damage due to heat transfer at the time of heat sealing can be sufficiently mitigated. On the other hand, in a case in which the thickness of the surface layer 11 is equal to or less than the upper limit value of the range described above, the rigidity of the multilayer film 10 for the container is not significantly increased, and the container such as an infusion bag manufactured by using the multilayer film 10 for the container has good flexibility.

Further, more specifically, in a case in which the total thickness of the multilayer film 10 for the container is 100 μm to 500 μm, the thickness of the surface layer 11 is preferably 3 μm to 30 μm.

The surface layer 11 may contain polyethylene, polypropylene, or other synthetic resins within the scope of the present invention. In a case in which the surface layer 11 contains polyethylene, polypropylene, or other synthetic resins, the content ratio of the other synthetic resins is preferably 40% by mass or less and more preferably 30% by mass or less with respect to 100% by mass of the material (composition) that forms the surface layer 11. A blend of the synthetic resin such as polyethylene, polypropylene, and the like, which has a lower melting point than the polymethylpentene resin, may lower the heat resistance of the surface layer 11 and impair the transparency. From these points, it is preferable that the surface layer 11 be made only of the polymethylpentene resin.

"Adhesive Layer"

The adhesive layer 12 is an interlayer adhesive layer that adheres the surface layer 11 to another layer such as the heat seal layer 13. The adhesive layer 12 is made of a thermoplastic elastomer.

As the thermoplastic elastomer, an olefin-based elastomer, a styrene-based elastomer, an urethane-based elastomer, a polyester-based elastomer, resin compositions containing these elastomers, and the like are exemplary examples. It is preferable that all the components of the multilayer film 10 for the container be formed of hydrocarbons and do not contain any components other than hydrocarbons from the viewpoint of hygiene and ease of recycling. Therefore, among these thermoplastic elastomers, a resin compositions containing the olefin-based elastomer and the styrene-based elastomer are preferable because of small amounts of eluent therefrom and suitableness thereof for recycling. Further, a polyolefin-based resin composition containing the styrene-based elastomer is more preferable in that it has exceptional flexibility. Further, as a polyolefin resin of the polyolefin-based resin composition, polyethylene, polypropylene, and the like are exemplary examples, and among these, polypropylene is preferable. More specifically, a propylene-based resin composition containing the styrene-based elastomer is most preferable.

A propylene-based resin, which is a component of the propylene-based resin composition, is a resin formed of a copolymer of propylene and at least one of ethylene and an α-olefin having 4 to 8 carbon atoms. With regard to the propylene-based resin, a content of components thereof other than propylene is preferably 12% by mass or less, a melting peak temperature thereof is preferably 130° C. to 170° C., and a heat of crystallization thereof is preferably 10 J/g to 50 J/g or less.

In the present embodiment, a "content of ethylene" is a value obtained from infrared spectroscopy or $^{13}$C-NMR spectrum. The "melting peak temperature" is a value obtained by the method described in JIS K 7121 by differential scanning calorimetry (DSC). The "heat of crystallization" is a value obtained by the method described in JIS K 7122 by differential scanning calorimetry (DSC).

In the manufacturing of such a propylene-based resin, first, propylene and ethylene are supplied, and if necessary, propylene and another α-olefin having 2 to 8 carbon atoms are supplied. Then, in the presence of a catalyst, polymerization is performed to obtain a propylene copolymer or a propylene-ethylene-α-olefin copolymer at a temperature of 50° C. to 150° C. and a partial pressure of propylene of 0.5 MPa to 4.5 MPa.

Next, propylene and at least one of ethylene and α-olefin having 4 to 8 carbon atoms are supplied. Then, in the presence of the catalyst, polymerization is performed to obtain a propylene-ethylene copolymer or a propylene-ethylene-α-olefin copolymer at a temperature of 50° C. to 150° C. and each of partial pressures of propylene and ethylene of 0.3 MPa to 4.5 MPa.

The styrene-based elastomer, that is another component of the propylene-based resin composition, is a hydrogenated derivative of a vinyl aromatic hydrocarbon/conjugated diene block copolymer. As the vinyl aromatic hydrocarbon, styrene, α-methylstyrene, and the like are exemplary examples. As the conjugated diene, butadiene and the like are exemplary examples.

The weight average molecular weight of the styrene-based elastomer is generally 100000 to 550000 in terms of a polystyrene-equivalent value measured by gel permeation chromatography (GPC).

As the propylene-based resin composition containing the styrene-based elastomer obtained from the propylene-based resin and the styrene-based elastomer, a resin composition obtained by melt-kneading and blending components of the styrene-based elastomer and the propylene-based resin, and a resin composition obtained by reactor blending in which components are contained in a reaction container at the stage of polymerization and are further melt-kneaded are exemplary examples. Among these, a reactor-blended type propylene-based resin composition containing a styrene-based elastomer obtained by the method of reactor-blending components is preferable in that the content of the styrene-based elastomer is easily increased and the particle size thereof can be reduced.

As a commercially available product of such a preferable propylene-based resin composition containing the styrene-based elastomer, "ZELAS MC719" manufactured by Mitsubishi Chemical Corporation is an exemplary example.

In a case in which the total thickness of the multilayer film 10 for the container is 100%, the thickness of the adhesive layer 12 is preferably 1% to 28%, more preferably 2% to 20%, and still more preferably 3% to 17%.

In a case in which the thickness of the adhesive layer 12 is within the range described above, the surface layer 11 and the heat seal layer 13 can be sufficiently adhered, and the total thickness of the multilayer film 10 for the container does not become larger than necessary. Further, more specifically, in a case in which the total thickness of the multilayer film 10 for the container is 100 μm to 500 μm, the thickness of the adhesive layer 12 is preferably 3 μm to 30 μm.

The adhesive layer 12 may contain other synthetic resins within the scope of the present invention. In a case in which the adhesive layer 12 contains other synthetic resins, the content ratio of the other synthetic resins is 40% by mass or less and more preferably 30% by mass or less with respect to 100% by mass of the material (composition) that forms the adhesive layer 12.

"Heat Seal Layer"

The heat seal layer 13 is a layer laminated on the surface layer 11 through the adhesive layer 12, melts by heat and is bonded when the multilayer film 10 for the container is formed into a bag shape. Further, in a case in which the multilayer film 10 for the container is formed into a bag shape, the heat seal layer 13 is a layer having a surface that comes into contact with the contents of the container.

The material that forms the heat seal layer 13 is not particularly limited, but may be the polyethylene resin composition or a polypropylene resin composition which is a mixed resin composition in which polyethylene or polypropylene is contained as a main component and a plurality of resins are mixed. Further, the material may be a thermoplastic elastomer different from the adhesive layer 12, especially a thermoplastic elastomer made of the propylene-based resin composition.

In a case in which the heat seal layer 13 contains polyethylene as the main component, the melting point difference between the heat seal layer 13 and the surface layer 11 is large, and thus the bag can be manufactured at a high speed. Further, in a case in which the heat seal layer 13 contains polyethylene as the main component, the amount of additives may be less as compared with the case in which polypropylene is the main component, or there may be no additive. Therefore, the heat seal layer 13 containing polyethylene as the main component is preferable in that it has exceptional hygiene in a case of being manufactured into a bag-shaped container, and further, has exceptional bag-dropping strength at an ordinary temperature to a low temperature equal to or lower than a room temperature.

In a case in which the heat seal layer 13 contains polypropylene as the main component or a case in which the heat seal layer 13 is made of the thermoplastic elastomer described above, the multilayer film 10 for the container, which is used for the container having exceptional heat resistance and enables high-pressure steam sterilization at 121° C. or higher, can be easily obtained as compared with a case in which the main component is polyethylene.

In addition, in the present specification, the main component refers to a component contained in more than 50% by mass in 100% by mass.

In a case in which the heat seal layer 13 contains polyethylene or polypropylene, the blending ratio thereof is more than 50% by mass, preferably 70% by mass or more, and more preferably 90% by mass or more.

As polyethylene, low-density polyethylene, high-density polyethylene, and linear low-density polyethylene are exemplary examples. The polyethylene may be used alone or in combination of two or more thereof.

The heat seal layer 13 may be a single layer or two or more layers.

For example, the heat seal layer 13 is formed of a single layer, and at least one selected from low-density polyethylene, high-density polyethylene, and linear low-density polyethylene can be used for this single layer. In this case, when at least one of low-density polyethylene and high-density polyethylene is mixed with linear low-density polyethylene, in a case in which the density of linear low-density polyethylene is low, the inner surfaces of the tubular films can be prevented from blocking when the film is formed by water quench blowing. Low-density polyethylene has exceptional flexibility and transparency. Although high-density polyethylene is hard, high-density polyethylene has high heat resistance, and the temperature of high-pressure steam sterilization performed with a bag-shaped container including the contents can be raised. Linear low-density polyethylene has particularly exceptional flexibility, also exceptional transparency, and exceptional bag-dropping strength when the multilayer film 10 for the container is formed into a bag-shaped container. Therefore, the polyethylene resin composition mixed in consideration of the properties of polyethylene can be used as the heat seal layer formed of a single layer.

In this case, in view of exceptional balance of the polyethylene resin composition of heat resistance, transparency, flexibility, and bag-dropping strength when the multilayer film 10 for the container is formed into a bag-shaped container, it is preferable that the mixing ratio of low-density polyethylene, high-density polyethylene, and linear low-density polyethylene be 5 parts by mass to 50 parts by mass of low-density polyethylene, 5 parts by mass to 50 parts by mass of high-density polyethylene, and 30 parts by mass to 90 parts by mass of linear low-density polyethylene. Further, it is more preferable that the mixing ratio thereof be 10 parts by mass to 40 parts by mass of low-density polyethylene, 10 parts by mass to 40 parts by mass of high-density polyethylene, and 40 parts by mass and 80 parts by mass of linear low-density polyethylene. Further, it is still more preferable that the mixing ratio thereof be 15 parts by mass to 30 parts by mass of low-density polyethylene, 15 parts by mass to 30 parts by mass of high-density polyethylene, and 50 parts by mass and 70 parts by mass of linear low-density polyethylene.

Further, the heat seal layer 13 is formed of two or more layers, and at least one selected from low-density polyethylene, high-density polyethylene, and linear low-density polyethylene can be used for one of the layers.

As a configuration in which the heat seal layer 13 is formed of two layers, a configuration formed of a layer made of linear low-density polyethylene and a layer made of high-density polyethylene is an exemplary example. Specifically, as the two-layer heat seal layer 13, the layer made of high-density polyethylene is used as a layer that forms the heat seal surface. Here, the heat seal surface refers to a surface to be adhered when the multilayer film 10 for the container is bonded by heat sealing. That is, the heat seal surface refers to a surface of the surfaces formed by the heat seal layer 13, which is on the other side of the surface layer 11. Further, as the two-layer heat seal layers 13, a heat seal layer in which two layers having different mixing ratio of linear low-density polyethylene and high-density polyethylene are combined, and high-density polyethylene is the main component in the layer that forms the heat seal surface is an exemplary example. Further, as the two-layer heat seal layers 13, a heat seal layer in which a layer made of a mixture of linear low-density polyethylene and high-density polyethylene and a layer made of high-density polyethylene are formed, and the layer made of high-density polyethylene is the layer that forms the heat seal surface is an exemplary example.

In particular, the multilayer film 10 for the container in which the layer that forms the heat seal surface of the heat seal layer 13 is a layer containing high-density polyethylene as the main component or a layer made of only high-density polyethylene is preferable from the following points. The multilayer film 10 for the container has exceptional flexibility and heat resistance, and has exceptional anti-blocking properties in which heat seal surfaces do not block each other in a case in which the container is formed from the film, the container is filled with the contents, and then high-pressure steam sterilization is performed. Further, in this case, the thickness of the layer that forms the heat seal surface containing high-density polyethylene is preferably 3 µm to 30 µm.

Further, the multilayer film 10 for the container in which the layer that forms the heat seal surface of the heat seal layer 13 is the layer made of high-density polyethylene, the layer of the heat seal layer 13 adjacent to the adhesive layer 12 is the layer made of the mixture of linear low-density polyethylene and high-density polyethylene is preferable from the following points. The multilayer film 10 for the container has exceptional heat resistance and superior film appearance as compared with the case in which the layer adjacent to the adhesive layer 12 is the layer made of linear low-density polyethylene.

Low-density polyethylene is also called high-pressure low-density polyethylene, and is polyethylene having a density of 910 kg/m$^3$ or more and less than 940 kg/m$^3$. Above all, low-density polyethylene having the MFR of 0.1 g/10 min to 20 g/10 min is preferable.

High-density polyethylene is polyethylene having a density of 940 kg/m$^3$ to 970 kg/m$^3$. Above all, high-density polyethylene having an MFR of 0.1 g/10 min to 20 g/10 min is preferable.

Linear low-density polyethylene is a copolymer of ethylene and one or more α-olefins selected from α-olefins having 3 to 20 carbon atoms.

Among α-olefins having 3 to 20 carbon atoms, α-olefin having 3 to 12 carbon atoms is preferable. Specifically, as α-olefin, propylene, 1-butene, 1-pentene, 4-methyl-1-pentene, 1-hexene, 1-octene, 1-decene, 1-dodecene, and the like are exemplary examples. Among these, propylene, 1-butene, 1-hexene, and 1-octene are preferable.

The content of α-olefin in the copolymer is generally 1% by mol to 30% by mol, and preferably 3% by mol to 20% by mol.

The density of linear low-density polyethylene is 900 kg/m$^3$ to 940 kg/m$^3$. The density of linear low-density polyethylene is preferably 900 kg/m$^3$ to 910 kg/m$^3$ in that it has exceptional adhesiveness to the adjacent layers.

The MFR of the linear low-density polyethylene is preferably 0.1 g/10 min to 20 g/10 min.

In the present specification, the density of each polyethylene is measured by the JIS K 7112 D method. The MFR of each polyethylene is a value measured at a temperature of 190° C. and under a load of 21.18 N according to JIS K 7210.

As polypropylene, isotactic polypropylene and syndiotactic polypropylene are exemplary examples.

As isotactic polypropylene, homopolypropylene, a random copolymer of propylene and at least one α-olefin (here, excluding propylene) selected from 2 to 20 carbon atoms, a propylene block copolymer, and the like are exemplary examples. In addition, examples thereof include a propylene-based resin, which is a component of the propylene-based resin composition containing the styrene-based elastomer, which is an exemplary example of a preferable resin as the adhesive layer 12.

As the thermoplastic elastomer used for the heat seal layer 13, a thermoplastic elastomer different from that used for the adhesive layer 12 is an exemplary example. More specifically, the thermoplastic elastomer is preferably non-sticky thermoplastic elastomer. In a case in which the thermoplastic elastomer used for the heat seal layer 13 is sticky, the container may not be opened or the opening thereof may be insufficient due to blocking between the inner surfaces of the container, which may hinder the filling of the contents. Further, in a case in which the container is heated by high-pressure steam sterilization or the like, the inner surfaces of the container come into close contact with each other, which may cause problems such as poor appearance. As a commercially available product of the thermoplastic elastomer used for the heat seal layer 13, an elastomer of a grade for medical applications and different from that of the adhesive layer 12 among the olefin-based elastomers "ZELAS" manufactured by Mitsubishi Chemical Corporation is an exemplary example. As such an olefin-based elastomer, an elastomer available on the market as a resin for an inner layer, such as "ZELAS 7025" is an exemplary example.

In a case in which the total thickness of the multilayer film 10 for the container is 100%, the thickness of the heat seal layer 13 is preferably 70% to 96%, more preferably 73% to 95%, and particularly preferably 75% to 90%.

In a case in which the thickness of the heat seal layer 13 is equal to or more than the lower limit value of the range described above, the strength physical properties of the film are sufficient. On the other hand, in a case in which the thickness of the heat seal layer 13 is equal to or less than the upper limit value of the range described above, the thicknesses of the surface layer 11 and the adhesive layer 12 are not relatively insufficient.

Specifically, the thickness of the heat seal layer 13 is preferably 30 µm to 270 µm.

In a case in which the heat seal layer 13 is formed of two layers, the ratio of the layer that forms the heat seal surface to the total thickness of the heat seal layer 13 is preferably 5% to 20%, and more preferably 5% to 15%.

In a case in which the heat seal layer 13 is made of the polyethylene resin composition containing polyethylene as the main component, the polyethylene resin composition may contain polypropylene or other synthetic resins. In a case in which the polyethylene resin composition contains polypropylene or other synthetic resins, the content ratio of polypropylene or other synthetic resins in 100% by mass of the polyethylene resin composition is preferably less than 50% by mass, and more preferably equal to or less than 30% by mass.

Further, in a case in which the heat seal layer 13 is made of the polypropylene resin composition containing polypropylene as the main component, the polypropylene resin composition may contain polyethylene or other synthetic resins. In a case in which the polypropylene resin composition contains polyethylene or other synthetic resins, the content ratio of polyethylene or other synthetic resins in 100% by mass of the polypropylene resin composition is preferably less than 50% by mass, and more preferably equal to or less than 30% by mass.

The multilayer film 10 for the container shown in FIG. 1 is formed of three layers, but may further have one or more other layers other than the surface layer 11, the adhesive layer 12, and the heat seal layer 13. Further, in that case, the multilayer film 10 for the container may have two or more adhesive layers.

As other layers, a resin layer made of one or more resins selected from an ethylene vinyl alcohol copolymer, a cyclic polyolefin resin, a polyolefin resin, and a polyester resin are exemplary examples. In addition, a barrier film layer such as a deposition film obtained by depositing a metal (aluminum, magnesium, or the like) or an inorganic oxide (silicon oxide or the like) and a coat film obtained by coating the surface of the resin film with a barrier coating agent such as polyvinylidene chloride, or a layer made of a metal foil such as an aluminum foil is an exemplary example.

As the polyester resin, a polyethylene terephthalate resin, a polybutylene terephthalate resin, and the like are exemplary examples.

As a specific layer configuration in a case in which the multilayer film 10 for the container further has one or more layers other than the surface layer 11, the adhesive layer 12, and the heat seal layer 13, the layer configurations are exemplary examples in which layers are sequentially provided, such as the surface layer/the adhesive layer/the polyethylene terephthalate resin layer/the adhesive layer/the heat seal layer, the surface layer/the adhesive layer/the ethylene vinyl alcohol copolymer/the adhesive layer/the heat seal layer, the surface layer/the adhesive layer/the barrier film layer/the adhesive layer/the heat seal layer, and the surface layer/the adhesive layer/the aluminum foil/the adhesive layer/the heat seal layer. However, it is preferable that the layer other than the surface layer 11, the adhesive layer 12, and the heat seal layer 13 be made of the polyolefin resin formed of only a carbon atom and a hydrogen atom from the viewpoint of recycling ease after disposal and exceptional hot water resistance.

The total thickness of the multilayer film 10 for the container is preferably 50 μm to 1000 μm, more preferably 70 μm to 600 μm, and still more preferably 100 μm to 500 μm.

The multilayer film 10 for the container can be manufactured by, for example, multilayer T-die casting, multilayer co-extrusion blown film extrusion, or the like. In a case in which the multilayer co-extrusion blown film extrusion is adopted, it is preferable to adopt the water quench blowing method in that a film having exceptional transparency can be obtained.

The multilayer film 10 for the container of the present embodiment includes the surface layer 11 made of the polymethylpentene resin, the adhesive layer 12 made of the thermoplastic elastomer and adjacent to the surface layer 11, and the heat seal layer 13 laminated on the surface layer 11 through the adhesive layer 12, and thus heat sealing can be performed at a high temperature and in a short amount of time, and the production efficiency of the container formed by heat sealing can be improved. Further, in the multilayer film 10 for the container of the present embodiment, since the surface layer 11 is made of the polymethylpentene resin, there is little eluent from the film even in a case in which the film is immersed in hot water, and the film has exceptional hot water resistance. Further, in the multilayer film 10 for the container of the present embodiment, since the surface layer 11 is made of the polymethylpentene resin, the melting point of the surface layer 11 can be raised without containing the inorganic substance such as hydrotalcite. Therefore, the multilayer film 10 for the container of the present embodiment can reduce the residue on ignition in the Japanese pharmacopoeia standard.

Further, in a case in which the multilayer film 10 for the container of the present embodiment is made of only a hydrocarbon compound, the film and the container including the film can be easily recycled. For example, by thermally decomposing the multilayer film 10 for the container of the present embodiment and the container including the multilayer film 10 for the container of the present embodiment, high-purity oil with few impurities can be easily obtained.

Further, since the multilayer film 10 for the container of the present embodiment has the surface layer 11 made of the polymethylpentene resin, the multilayer film 10 for the container has exceptional transparency.

[Container]

The container of the present invention is the container including the multilayer film for the container of the present invention. The container of the present invention is a container of various forms such as a bag shape and a cup shape in which the outer surface of the heat seal layer of the multilayer film for the container is the heat seal surface.

Figure 2:
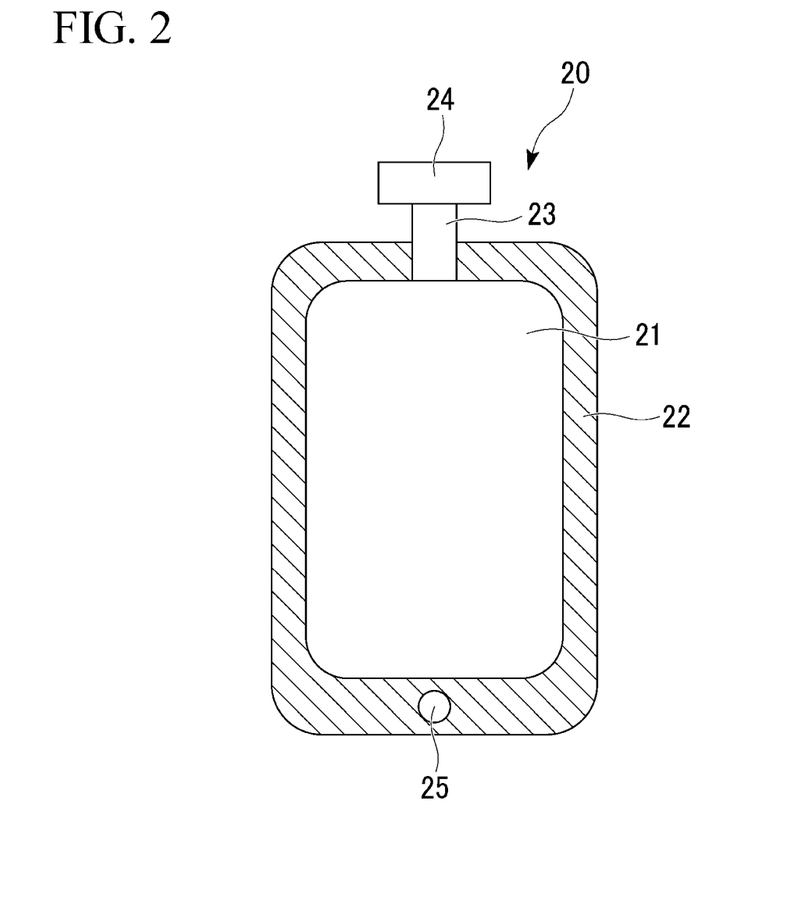
FIG. 2 is a front view showing a schematic configuration of the infusion bag as an embodiment of a container of the present invention.

FIG. 2 is a front view showing a schematic configuration of the infusion bag as an embodiment of the container of the present invention.

As shown in FIG. 2, an infusion bag 20 of the present embodiment includes a liquid medicine storage chamber 21, a heat seal portion 22 formed on the outer edge of the liquid medicine storage chamber 21, and a discharging and injection port member 23 which is a discharging and injection port of the liquid medicine from the liquid medicine storage chamber 21.

The liquid medicine storage chamber 21 is made of the multilayer film 10 for the container, which is described above.

The liquid medicine storage chamber 21 is formed by overlapping two multilayer films 10 for the container having substantially rectangular surfaces such that the heat seal layers 13 face each other, and heat sealing the peripheral edge portion of the overlapped multilayer films 10 for the container. That is, the liquid medicine storage chamber 21 is a space formed inside the heat seal portion 22 formed by heat sealing. The heat seal portion 22 forms the peripheral edge portion of the infusion bag 20. Further, the outermost layers of the liquid medicine storage chamber 21 and the heat seal portion 22 are formed of the surface layer 11 of the multilayer film 10 for the container. Hereinafter, the thickness direction of the multilayer film 10 for the container may be referred to as the thickness direction of the heat seal portion 22, and the longitudinal direction of the substantially rectangular surface of the multilayer film 10 for the container may be referred to as the length direction of the infusion bag 20.

The discharging and injection port member 23 is sandwiched by and attached to part of the heat seal portion 22 by heat welding of two multilayer films 10 for the container. The discharging and injection port member 23 is provided on one end side of the heat seal portion 22 in the length direction of the infusion bag 20. The discharging and injection port member 23 is a tubular member also called a port, and the inside thereof communicates with the inside of the liquid medicine storage chamber 21. Further, a rubber plug 24 is provided at the end on the side of the discharging and injection port member 23 opposite to the side attached to the heat seal portion 22. Further, a hanging hole 25 for hanging the infusion bag 20 is formed on the side of the heat seal portion 22 opposite to the discharging and injection port member 23 in the length direction of the infusion bag 20. The hanging hole 25 penetrates the heat seal portion 22 in the thickness direction thereof.

Since the infusion bag 20 of the present embodiment includes the multilayer film 10 for the container having the surface layer 11 made of the polymethylpentene resin, it has low water absorption and has exceptional hot water resistance. Therefore, with the infusion bag 20 of the present embodiment, the liquid property of the infusion solution to be stored can be maintained, and the quality of the infusion solution can be kept good.

A bag-shaped infusion bag such as the infusion bag 20 of the present embodiment can be a multi-chamber infusion bag in which a peelable weak seal portion is formed in the liquid medicine storage chamber and a plurality of the liquid medicine storage chambers partitioned by the weak seal portion are provided. Further, each of the discharging and injection port member 23 and the hanging hole 25 may be provided on both end sides of the heat seal portion 22 in the lateral direction of the substantially rectangular surface of the multilayer film 10 for the container (width direction of the infusion bag 20).

EXAMPLES

The present invention will be described below in more detail with reference to Examples and Comparative Examples, but the present invention is not limited to the following Examples.
[Multilayer Film for Container]

Example

The multilayer film for the container was manufactured by using the resins shown below.
polymethylpentene resin, Mitsui Chemicals, Inc., TPX "MX0020", density=0.834 g/cm$^3$, MFR=21 g/10 min, melting peak temperature=224° C.
TPO: olefin-based thermoplastic elastomer, Mitsubishi Chemical Corporation, ZELAS MC719, density=0.894 g/cm$^3$, MFR=3.5 g/10 min, melting peak temperature=155° C.
LLD: linear low-density polyethylene, Japan Polyethylene Corporation, Harmorex, density=0.908 g/cm$^3$, MFR=0.9 g/10 min
LD: low-density polyethylene, Japan Polyethylene Corporation, Novatec LD, LM360, Density=0.928 g/cm$^3$, MFR=0.9 g/10 min
HD: high-density polyethylene, Japan Polyethylene Corporation, Novatec HD, density=0.955 g/cm$^3$, MFR=1.8 g/10 min The multilayer film for the container having a folding size of 140 mm and a total thickness of 200 μm in which the surface layer, the adhesive layer, and the heat seal layer were provided in this order was manufactured by forming with a water quenching blown film making machine such that the surface layer was on the outside. That is, the polymethylpentene resin was used for the surface layer, the olefin-based thermoplastic elastomer (TPO) was used for the adhesive layer, and the mixed resin made of 60 parts by mass of linear low-density polyethylene (LLD), 20 parts by mass of low-density polyethylene (LD), and 20 parts by mass of high-density polyethylene (HD) was used for the heat seal layer.
Further, the set temperature of the extruder of the water quenching blown film making machine was 260° C. Further, the thickness of the surface layer was 15 μm, the thickness of the adhesive layer was 15 μm, and the thickness of the heat seal layer was 170 μm. Here, the ratio of the thicknesses of the layers was surface layer:adhesive layer:heat seal layer=7.5:7.5:85.

Comparative Example

The multilayer film for the container was manufactured by using the resins shown below.
PA11: polyamide 11, Arkema K.K., RILSAN "BESV 0 A FDA", density=1.02 g/cm$^3$, melting peak temperature=184° C. to 188° C.
AD: maleic anhydride grafted polypropylene, Mitsubishi Chemical Corporation, ZELAS "MC721AP", density=0.894 g/cm$^3$, MFR=3.5 g/10 min (measured value according to JIS K 7210 at temperature of 230° C. and load of 21.18 N), melting peak temperature=155° C.
hydrotalcite: $Mg_{4.5}Al_2(OH)_{13}CO_{3.3} \cdot 5H_2O$, Kyowa Chemical Industry Co., Ltd., DHT-4A
The multilayer film for a container having a folding size of 140 mm and a total thickness of 200)μm was manufactured by forming with a water quenching blown film making machine in the same manner as in Example 1 except that a polyamide resin composition in which 0.5 parts by mass of hydrotalcite was added to 100 parts by mass of polyamide 11 (PA11) was used for the surface layer and a maleic anhydride grafted polypropylene resin (AD) was used for the adhesive layer.
Regarding the multilayer films for the container obtained in Example and Comparative Example, a test was conducted based on the standard for a polyethylene or polypropylene aqueous injection container in the test methods for plastic containers of the 17th revised Japanese pharmacopoeia part 1 general test method. The results are shown in Table 1.

TABLE 1

| Test item | | Japanese pharmacopoeia standard | Example | Comparative Example |
|---|---|---|---|---|
| Heavy metal | | Test solution is not dense than comparative solution | Test solution is not dense than comparative solution | Test solution is not dense than comparative solution |
| Lead | | Absorbance is equal to or less than that of standard solution. | Absorbance is equal to or less than that of standard solution. | Absorbance is equal to or less than that of standard solution. |
| Cadmium | | Absorbance is equal to or less than that of standard solution. | Absorbance is equal to or less than that of standard solution. | Absorbance is equal to or less than that of standard solution. |
| Residue on ignition | | Residue is 0.1% or less | Less than 0.01% | 0.05% |
| Eluent | Foaming | Almost thereof disappears within 3 minutes. | Almost thereof disappears within 3 minutes. | Almost thereof disappears within 3 minutes. |
| | pH | Difference is 1.5 or less | 0.5 | 1.0 |
| | Potassium permanganate reducing substance | Difference is 1.0 mL or less | Less than 0.1 mL | Less than 0.1 mL |
| | Ultraviolet absorption spectrum (wavelength of 220 nm or more and less than 241 nm) | Absorbance is 0.08 or less | Less than 0.01 | Less than 0.01 |

TABLE 1-continued

| Test item | Japanese pharmacopoeia standard | Example | Comparative Example |
|---|---|---|---|
| Ultraviolet absorption spectrum (wavelength of 241 nm or more and less than 350 nm) | Absorbance is 0.05 or less | Less than 0.01 | Less than 0.01 |
| Residue on evaporation | 1.0 mg or less | Less than 0.1 mg | Less than 0.1 mg |
| Transparency test | 55% or more | 82% | 73% |

As shown in Table 1, the residue on ignition, which is a concern for elution into hot water, was 0.05% in Comparative Example, whereas the residue on ignition was less than 0.01% in Example, which was equal to or less than the detection limit and very few. The test for the residue on ignition was conducted to know the content of the inorganic substances contained as the impurities in the resin.

Further, in the pH test, the pH difference between the test solution and the blank test solution in Comparative Example was 1.0, whereas the pH difference between the test solution and the blank test solution in Example was 0.5, which was halved from the Comparative Example. Therefore, it was found that the multilayer film for the container of Example had less influence on the contents thereof and was suitable as the film used for the container for pH-sensitive medicine.

The results of the transparency test were values indicating the light transmittance of the multilayer films for the container of Example and Comparative Example after the bag-shaped container was manufactured from the multilayer film for the container, filled with distilled water, sealed, and subjected to high-pressure steam sterilization at 121° C. for 30 minutes. The transparency of multilayer film for the container of Comparative Example was 73%, while the transparency of multilayer film for the container of Example was 82%. That is, the multilayer film for the container of Example had exceptional transparency.

Further, since the multilayer film for the container of Example does not contain an amide group-containing compound that causes water absorption, is made of a polyolefin resin of a hydrocarbon-based resin, and has no polar group, the multilayer film for the container of Example is a film having low water absorption, Further, the melting peak temperature of the resin in the surface layer of the multilayer film for the container of Example is 224° C., which is higher than the melting peak temperature of the resin in the surface layer of the multilayer film for container of Comparative Example of 184° C. to 188° C. Therefore, in the multilayer film for the container of Example, the temperature of the heat seal bar can be set to be a high temperature, so that heat sealing can be performed in a shorter time, and the production efficiency of the container can be improved.

[Container]

By using the multilayer film for the container of Example, the infusion bag having a size of 250 mm in length×120 mm in width as shown in FIG. 2 was manufactured at a sealing die temperature of 200° C., a pressure of 0.4 MPa, and in a sealing time of 2 seconds.

The obtained infusion bag was filled with 200 mL of distilled water and sealed with the rubber plug.

The infusion bag filled with distilled water was subjected to high-pressure steam sterilization at 121° C. for 30 minutes, and then the transparency and appearance were visually evaluated.

As a result, in the infusion bag using the multilayer film for the container of Example, no cloudiness or the like was observed in the film that forms the infusion bag, transparency with the light transmittance of 82% was showed, a problem was not observed, the multilayer film for the container was not wrinkled by breaking or shrinking, the surface of the infusion bag was smooth, and the appearance thereof was fine.

According to the present invention, it is possible to provide the multilayer film for the container and a container including the multilayer film, which enable heat sealing at a high temperature and in a short amount of time, have exceptional hot water resistance, and reduces the eluent therefrom.

INDUSTRIAL APPLICABILITY

The multilayer film for the container of the present invention can be heat sealed at a high temperature in a short amount of time. Therefore, the multilayer film for the container of the present invention is suitable for manufacturing the container including the bag or the like. Further, the multilayer film for the container of the present invention has exceptional hot water resistance, and thus it is particularly suitable for a container for storing a liquid medicine, blood, or the like in the medical field.

REFERENCE SYMBOLS

10: multilayer film for container
11: surface layer
12: adhesive layer
13: heat seal layer
20: infusion bag
21: liquid medicine storage chamber
22: heat seal portion
23: discharging and injection port member
24: rubber plug
25: hanging hole

The invention claimed is:

1. A multilayer film for a container, the multilayer film comprising:
   a surface layer made of a polymethylpentene resin;
   an adhesive layer made of a thermoplastic elastomer and adjacent to the surface layer; and
   a heat seal layer laminated on the surface layer through the adhesive layer,
   wherein the multilayer film is made of only hydrocarbon compounds.

2. The multilayer film for a container according to claim 1,
   wherein the thermoplastic elastomer is a polyolefin-based resin composition containing a styrene-based elastomer.

3. The multilayer film for a container according to claim 1,
   wherein the heat seal layer is formed of two or more layers, and
   a layer that forms a heat seal surface of the heat seal layer is made of linear low-density polyethylene.

4. The multilayer film for a container according to claim 1,
   wherein the heat seal layer is formed of two or more layers, and
   a layer that forms a heat seal surface of the heat seal layer is made of high-density polyethylene.

5. The multilayer film for a container according to claim 1,
   wherein the heat seal layer is made of a mixed resin composition in which two or more types of resins are mixed.

6. A container comprising the multilayer film for a container according to claim 1.

7. The multilayer film for a container according to claim 2,
   wherein the heat seal layer is formed of two or more layers, and
   a layer that forms a heat seal surface of the heat seal layer is made of linear low-density polyethylene.

8. The multilayer film for a container according to claim 2,
   wherein the heat seal layer is formed of two or more layers, and
   a layer that forms a heat seal surface of the heat seal layer is made of high-density polyethylene.

9. The multilayer film for a container according to claim 2, wherein the heat seal layer is made of a mixed resin composition in which two or more types of resins are mixed.

10. The multilayer film for a container according to claim 1,
    wherein a melting point difference that is a difference between a melting point of the surface layer and a melting point of the heat seal layer is 40° C. or higher,
    in a case in which a total thickness of the multilayer film for a container is 100%, a thickness of the surface layer is 2% to 8%, the total thickness of the multilayer film for a container being a sum of the thickness of the surface layer, a thickness of the adhesive layer and a thickness of the heat seal layer,
    in the case in which the total thickness of the multilayer film for a container is 100%, the thickness of the adhesive layer is 3% to 17%, and
    in the case in which the total thickness of the multilayer film for a container is 100%, the thickness of the heat seal layer is 75% to 90%.

* * * * *